Figure 1:
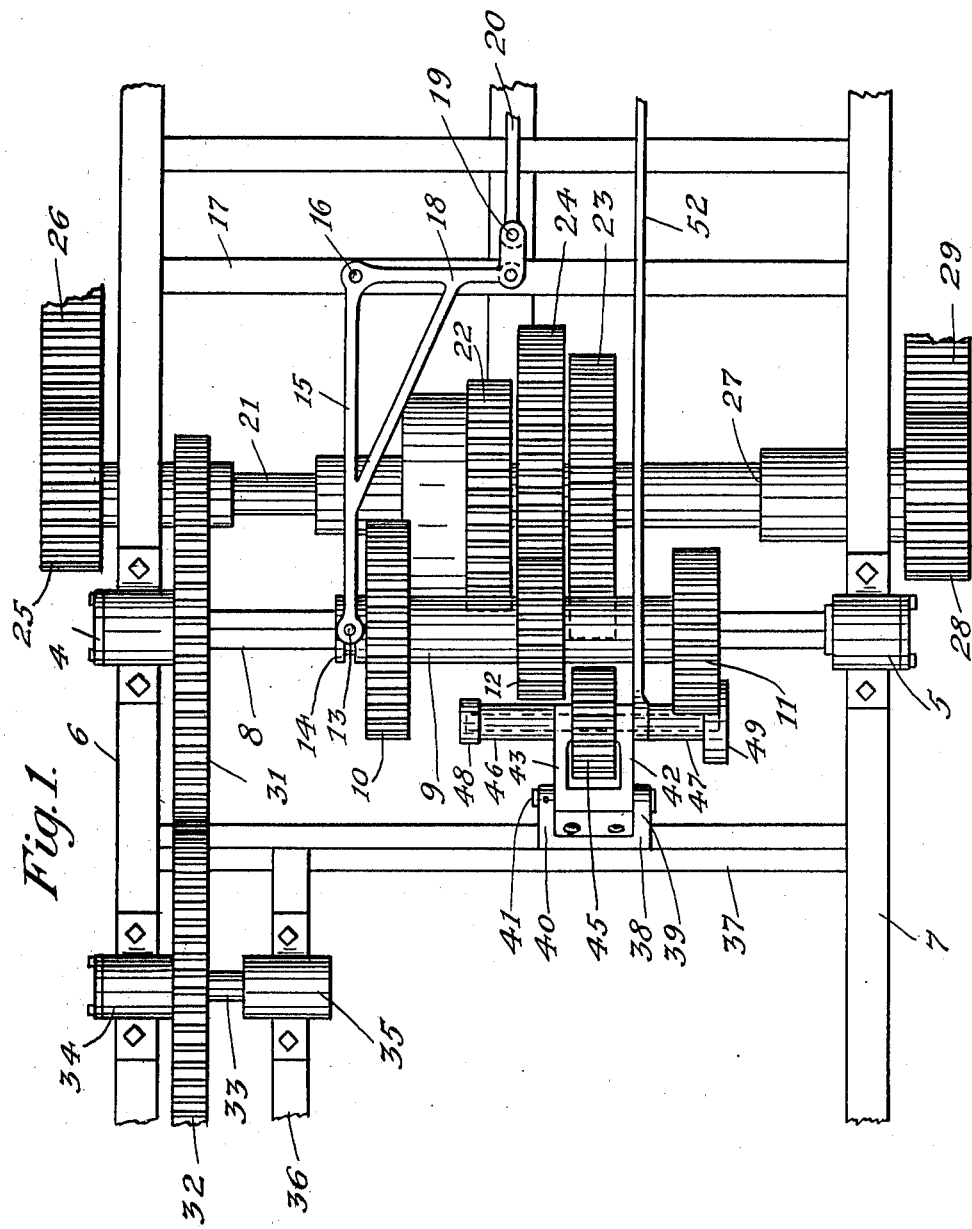

E. M. WHEELOCK.
REVERSING GEARING.
APPLICATION FILED JUNE 9, 1911.

1,021,029.

Patented Mar. 26, 1912.

2 SHEETS—SHEET 1.

Witnesses:
Theo. Lagaard
H. A. Bowman.

Inventor:
Edwin M. Wheelock.
By F. A. Whiteley
his Attorney.

E. M. WHEELOCK.
REVERSING GEARING.
APPLICATION FILED JUNE 9, 1911.
1,021,029.
Patented Mar. 26, 1912.
2 SHEETS—SHEET 2.
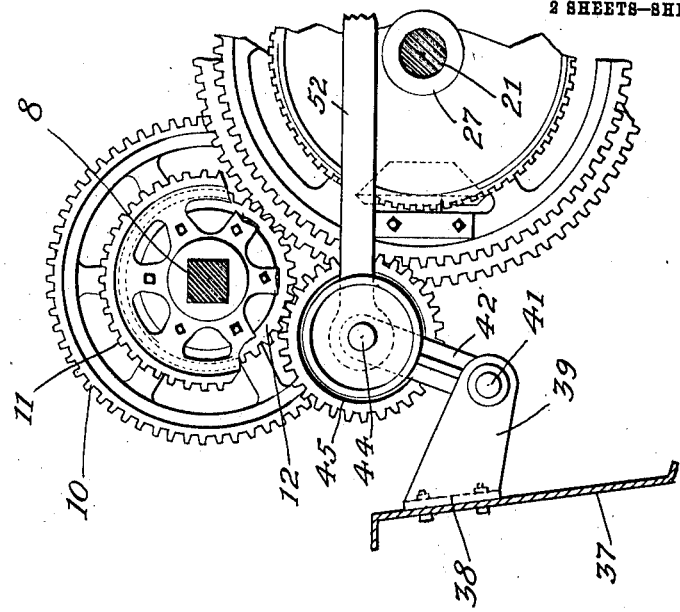
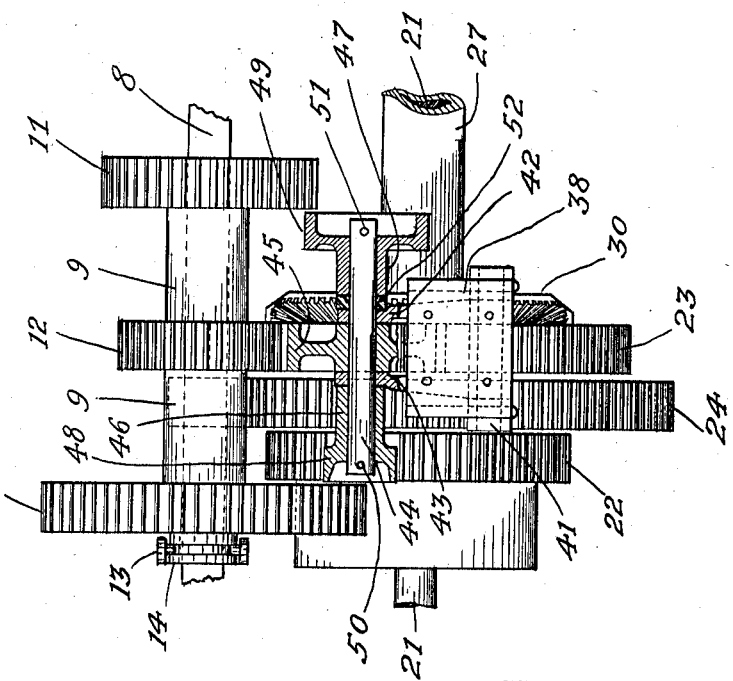
WITNESSES
Theo. Løgaard.
H. A. Bowman.
INVENTOR
Edwin M. Wheelock.
BY
F. A. Whiteley
ATTORNEY

UNITED STATES PATENT OFFICE.

EDWIN M. WHEELOCK, OF WINONA, MINNESOTA.

REVERSING-GEARING.

1,021,029.  Specification of Letters Patent.  Patented Mar. 26, 1912.

Application filed June 9, 1911. Serial No. 632,275.

*To all whom it may concern:*

Be it known that I, EDWIN M. WHEELOCK, a citizen of the United States, residing at Winona, in the county of Winona and State of Minnesota, have invented certain new and useful Improvements in Reversing-Gearing for Traction-Engines, of which the following is a specification.

My invention relates to change speed and reversing gearing for traction engines.

It is the object of my invention to provide a change speed gearing capable of transmitting low, high, and intermediate speeds and a reversing gear adapted to coöperate only with one of said change speed gears and having means such that it will be impossible to throw the reversing gear into operation when the gearing is operative to transmit direct movement to the operative shaft.

The full objects and advantages of my invention will appear in connection with the detailed description thereof and are particularly pointed out in the claims.

In the drawings illustrating the application of my invention in one form,—Figure 1 is a plan view. Fig. 2 is an end elevation partly in section viewed toward the right in Fig. 1. Fig. 3 is a side elevation In Fig. 1 the reversing gear is shown inoperative while in Figs. 2 and 3 it is shown in operative position. Journaled in boxes 4 and 5 upon frame members 6 and 7 is a square shaft 8 having thereon a sleeve 9 provided with a series of gears 10, 11 and 12, spaced apart sufficiently to permit the desired operation of reversing gear mechanism hereinafter described, the intermediate of said gears 12 being the smaller for the purpose of coöperation with said reversing gear. The sleeve 9 is freely slidable upon the shaft 8 being controlled by a fork 13 operating in a collar 14 on the sleeve 9, said fork being at the end of one arm 15 of a lever pivoted at 16 to a frame member 17, the other arm 18 of said lever being pivotally connected at 19 with a link 20 which in turn is connected with a hand operative change speed lever, not shown. A shaft 21 is journaled in bearings carried by frame members 6 and 7 and said shaft has thereon a series of different sized gears 22, 23 and 24 adapted to coöperate with the gears 10, 11 and 12, respectively. One end of the shaft 21 carries a driving pinion 25 coöperating with main drive gear 26 on a traction wheel, not shown, while the other end of shaft 21 has loose thereon a sleeve 27 having a driving pinion 28 coöperating with the drive gear 29 on the other traction wheel, not shown, the sleeve 27 being connected with the shaft 21 by means of differential gearing 30 of well known construction. The square shaft 8 has thereon a large gear 31 coöperating with a gear 32 mounted on a short shaft 33 in bearings 34 and 35 on frame member 6 and a supplemental frame member 36, respectively, said gear 32 coöperating with a gear on the engine shaft, not shown.

To a transverse frame member 37 is secured a bracket 38 having two ears 39 and 40, respectively, in which is journaled the pivot pin 41 provided with two arms 42 and 43. In the arms 42 and 43 is journaled a shaft 44, said shaft having loose thereon between the arms 42 and 43 an idler gear 45. The shaft 44 extends to either side of the arms 42 and 43 and has loose thereon sleeves 46 and 47 carrying disks 48 and 49, respectively, said sleeves being held upon the shaft 44 by means of pins 50 and 51. Between arm 42 and sleeve 47 a link 52 is pivotally connected to shaft 44, said link being connected with a hand operative lever by means of which the idler reversing gear 45 is swung into and out of operative position. The gear 45 is adapted to coöperate at the same time with the central gear 12 on the sleeve 9 and the outside gear 23 on the shaft 21, operating when in this position to drive shaft 21 in reverse direction at reduced speed. The disks 48 and 49 on the shaft 44 are so positioned as to drop between outside gears 10 and 11 on sleeve 9 when gear 12 is positioned opposite gear 23, in which position owing to the spacing between gear 12 and gears 10 and 11 direct driving connection between square shaft 8 and shaft 21 will be broken. In this relative position of the gears on sleeve 9 and shaft 21, respectively, it will be possible to swing the reversing gear 45 into the position shown in Figs. 2 and 3 to complete reversing connection. Should, however, the sleeve 9 be positioned to either side of the above indicated position so that either gears 12 and 24 or 10 and 22 have direct driving connection, then, if an attempt is made to throw in the reversing gear, disk 49 would engage gear 11 or disk 48 would engage gear 10 and prevent reversing gear 45 reaching connecting position and the consequent breakage which in such a situation would inevitably result.

My reversing and change speed gearing is simple and compact, very efficient for the purpose intended and provides ample protection from injury which might result from improperly connecting the reversing gear when the gears are connected for direct driving action, by rendering absolutely impossible such double connection.

I claim:

1. In a traction engine, a driven shaft, a sleeve slidable on said shaft, a plurality of gears on said sleeve spaced one from the other, a countershaft, a grouped series of gears on said counter shaft each adapted to coöperate with one of said gears on the sleeve, an idler gear movable into position to mesh simultaneously with a gear on said sleeve and a gear on said countershaft to effect reverse movement of the countershaft, and means movable with the idler gear to coöperate with the other gears on the sleeve to prevent said idler gear engaging said gears on the sleeve and on the countershaft when any of said gears are in mesh for direct driving action.

2. In a traction engine, a driven shaft square in cross section, a sleeve fitting said square shaft and slidable thereon, three different sized gears on said shaft, the intermediate gear being the smallest, a countershaft, three correspondingly different-sized gears on said countershaft grouped in reverse order and each adapted to coöperate with a gear on said sleeve, an idler gear pivoted to a frame member opposite an outside gear of the group on said shaft, means to swing said idler gear into position to mesh simultaneously with said outside gear and said smallest gear on the sleeve, and means movable with said pivoted gear to engage one or the other of the larger gears on the sleeve and prevent reversing engagement of said idler with said outside gear and said smallest gear when either of said larger gears is in mesh with a gear on the shaft.

3. In a traction engine, a driven shaft, a sleeve slidable on said shaft, three different-sized gears spaced apart on the sleeve the intermediate gear being the smallest, a countershaft, a grouped series of gears on the countershaft, a pair of pivoted arms, a shaft carried by said arms, a gear on said shaft between the arms in the plane of a gear on the countershaft, disks on the shaft outside of said arms, and means to swing the arms to bring the gear therebetween simultaneously into mesh with said opposite gear and said smallest gear on the sleeve, the disks operating to engage a gear on the shaft and prevent such simultaneous meshing when the gears on the sleeve and shaft are connected for direct driving action.

In testimony whereof I affix my signature in presence of two witnesses.

EDWIN M. WHEELOCK.

Witnesses:
H. A. BOWMAN,
F. A. WHITELEY.

---

Copies of this patent may be obtained for five cents each, by addressing the "Commissioner of Patents, Washington, D. C."